(12) United States Patent
Tanaka

(10) Patent No.: US 10,348,211 B2
(45) Date of Patent: Jul. 9, 2019

(54) POWER CONVERSION DEVICE AND POWER CONVERSION SYSTEM

(71) Applicant: SHARP KABUSHIKI KAISHA, Sakai, Osaka (JP)

(72) Inventor: Hiroki Tanaka, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/208,395

(22) Filed: Dec. 3, 2018

(65) Prior Publication Data

US 2019/0173387 A1 Jun. 6, 2019

(30) Foreign Application Priority Data

Dec. 6, 2017 (JP) ................................. 2017-234372

(51) Int. Cl.
*H02M 3/335* (2006.01)
*H02M 1/08* (2006.01)

(52) U.S. Cl.
CPC ......... *H02M 3/33584* (2013.01); *H02M 1/08* (2013.01)

(58) Field of Classification Search
CPC ...... H02M 3/33584; H02M 1/08; H02M 1/32; H02M 3/07; H02M 3/33546; H02M 3/33561; H02M 3/1582; H02M 2001/009; H02M 3/325; H02M 3/335; H02M 3/33569; H02M 3/33507
See application file for complete search history.

(56) References Cited

U.S. PATENT DOCUMENTS

| | | | | |
|---|---|---|---|---|
| 9,660,543 B2* | 5/2017 | Takagi | ............... | H02M 3/33546 |
| 9,685,877 B2* | 6/2017 | Miura | ............... | H02M 3/33561 |
| 9,973,099 B2* | 5/2018 | Ye | ..................... | H02M 3/33576 |
| 10,171,004 B2* | 1/2019 | Itoh | .................... | H02M 3/33584 |
| 2011/0188267 A1* | 8/2011 | Lai | ........................ | H02M 3/335 363/17 |
| 2013/0265804 A1* | 10/2013 | Fu | ..................... | H02M 3/33576 363/17 |
| 2014/0104907 A1 | 4/2014 | Shimada et al. | | |
| 2014/0254209 A1* | 9/2014 | Takagi | ............... | H02M 3/33546 363/21.04 |
| 2017/0358996 A1* | 12/2017 | Higaki | ...................... | H02J 1/00 |
| 2018/0034359 A1* | 2/2018 | Chen | ..................... | H02M 1/083 |

FOREIGN PATENT DOCUMENTS

| | | |
|---|---|---|
| JP | 2014-079133 A | 5/2014 |
| JP | 2017-130997 A | 7/2017 |

* cited by examiner

*Primary Examiner* — Kyle J Moody
(74) *Attorney, Agent, or Firm* — ScienBiziP, P.C.

(57) ABSTRACT

In a power conversion device, a voltage at an input/output terminal of a primary-side circuit is divided by a first capacitor and a second capacitor, and a center tap provided to the primary winding of a transformer is connected to a node between the first capacitor and the second capacitor. With this, an intermediate voltage can be output. Further, transmission power can be controlled under a state where a voltage at the first capacitor and a voltage at the second capacitor are balanced, through adjustment of switching phases of a first full bridge circuit that is the primary-side circuit and a second full bridge circuit that is a secondary-side circuit.

7 Claims, 15 Drawing Sheets

POWER CONVERSION DEVICE AND POWER CONVERSION SYSTEM

BACKGROUND

1. Field

The present disclosure relates to a power conversion device, and in particular, to an isolated bidirectional power conversion device. The isolated bidirectional power conversion device is used, for example, for a storage battery system or an electric vehicle charge/discharge system using an electric vehicle.

2. Description of the Related Art

In recent years, a photovoltaic power generation system, a stationary battery system, and a charge/discharge system using a storage battery mounted on an electric vehicle have drawn attention. It has been considered to use, as a power conversion device that is used in these systems, a power conversion device in which an isolated DC/DC power conversion device and an AC/DC power conversion device are connected to each other by a DC bus. For example, Japanese Unexamined Patent Application Publication No. 2017-130997 discloses an isolated DC/DC power conversion device. Further, it has been considered to use, as an AC/DC power conversion device, a device that supports a single-phase three-wire system, thereby supporting autonomous operation in the event of a power failure. Japanese Unexamined Patent Application Publication No. 2014-79133 discloses an AC/DC power conversion device supporting the single-phase three-wire system.

The AC/DC power conversion device disclosed in Japanese Unexamined Patent Application Publication No. 2014-79133, however, includes a switching circuit for generating and controlling a potential at a neutral conductor for an AC output of the single-phase three-wire system in the event of a power failure. The AC/DC power conversion device disclosed in Japanese Unexamined Patent Application Publication No. 2014-79133 may have an issue regarding efficiency, size, cost, and other aspects.

In view of the circumstances described above, it is desirable to provide an isolated DC/DC conversion circuit (power conversion device) capable of outputting an intermediate voltage having a potential at a neutral conductor for an AC output of a single-phase three-wire system of an AC/DC power conversion circuit, and a power conversion system using the isolated DC/DC conversion circuit.

SUMMARY

A power conversion device according to an aspect of the present disclosure includes: a first capacitor circuit that includes a first capacitor and a second capacitor connected in series; a first full bridge circuit and a second full bridge circuit; a transformer; a first reactor connected between the first full bridge circuit and the transformer; a second reactor connected between the first full bridge circuit and the transformer; a third reactor connected between the second full bridge circuit and the transformer; and a controller. The first full bridge circuit includes a first switching leg that includes a first switching element and a second switching element connected to each other, and a second switching leg that includes a third switching element and a fourth switching element connected to each other. The first full bridge circuit is connected in parallel to the first capacitor circuit. The transformer includes a center tap at primary winding. The center tap is connected to a node between the first capacitor and the second capacitor. One end of the first reactor is connected to a node between the first switching element and the second switching element. One end of the second reactor is connected to a node between the third switching element and the fourth switching element. The second full bridge circuit includes a third switching leg that includes a fifth switching element and a sixth switching element connected to each other, and a fourth switching leg that includes a seventh switching element and an eighth switching element connected to each other. One end of the third reactor is connected to a node between the fifth switching element and the sixth switching element. The first switching element to the eighth switching element are connected in parallel to respective capacitors. The controller controls switching of the first switching element to the eighth switching element to adjust a retardation of switching between the first full bridge circuit and the second full bridge circuit, and controls transmission power.

A power conversion system according to an aspect of the present disclosure includes the power conversion device configured as described above. The power conversion device configured as described above further includes an AC/DC conversion circuit. The AC/DC conversion circuit includes: a fifth switching leg that includes a ninth switching element and a tenth switching element connected to each other, a sixth switching leg that includes an eleventh switching element and a twelfth switching element connected to each other; a second capacitor circuit that includes a third capacitor and a fourth capacitor connected in series; a fourth reactor connected between a node between the ninth switching element and the tenth switching element, and one end of the second capacitor circuit; and a fifth reactor connected between a node between the eleventh switching element and the twelfth switching element, and another end of the second capacitor circuit. The one end of the second capacitor circuit is a first AC input/output terminal, the another end of the second capacitor circuit is a second AC input/output terminal, and a node between the third capacitor and the fourth capacitor is a third AC input/output terminal. The node between the third capacitor and the fourth capacitor is connected to the node between the first capacitor and the second capacitor. In a normal state, a power grid, and the first AC input/output terminal and the second AC input/output terminal are connected to each other. In an event of a power failure, an AC load, and the first AC input/output terminal, the second AC input/output terminal, and the third AC input/output terminal are connected to each other.

DESCRIPTION OF THE EMBODIMENTS

First Embodiment

Figure 1:
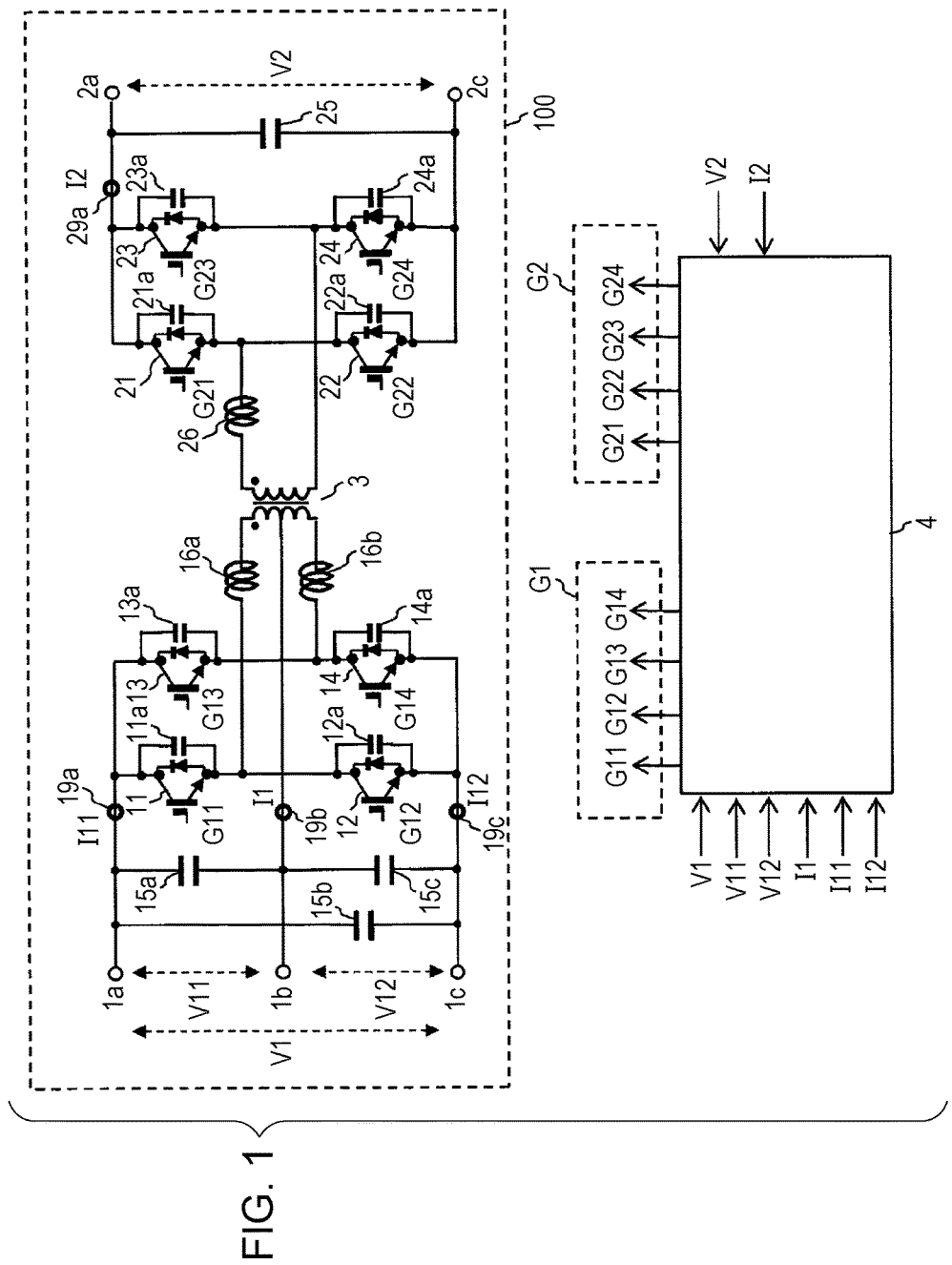
FIG. 1 is a configuration diagram illustrating a power conversion device according to a first embodiment of the present disclosure.

A first embodiment of the present disclosure is now described in detail with reference to the drawings. FIG. 1 is a configuration diagram illustrating a power conversion device according to the first embodiment of the present disclosure.

The power conversion device of the present embodiment is a DC/DC power conversion circuit having primary-side input/output terminals $1a$, $1b$, and $1c$ and secondary-side input/output terminals $2a$ and $2c$.

A capacitor $15a$ is connected between the input/output terminal $1a$ and the input/output terminal $1b$. A capacitor $15c$ is connected between the input/output terminal $1b$ and the input/output terminal $1c$. A capacitor $15b$ is connected between the input/output terminal $1a$ and the input/output terminal $1c$. Further, a capacitor 25 is connected between the input/output terminal $2a$ and the input/output terminal $2c$.

A primary-side full bridge circuit including four insulated gate bipolar transistors (IGBTs) 11 to 14 is formed on the primary side of a transformer 3. Further, a secondary-side full bridge circuit including four IGBTs 21 to 24 is formed on the secondary side of the transformer 3. Further, capacitors are connected in parallel to the respective IGBTs and diodes are connected in inverse parallel to the respective IGBTs. The capacitors connected in parallel to the respective IGBTs enable the IGBTs of each full bridge circuit to perform operation that is close to zero voltage switching, which can reduce switching losses. In the present embodiment, the IGBTs are used as the switching elements, but switching elements such as field effect transistors (FETs) or high electron mobility transistors (HEMTs) can be used instead of the IGBTs. When the switching elements include inverse-parallel diodes, the diodes connected in inverse parallel to the switching elements can be omitted.

Further, the primary-side full bridge circuit includes a first switching leg that includes the IGBT 11 and the IGBT 12 connected to each other, and a second switching leg that includes the IGBT 13 and the IGBT 14 connected to each other.

In addition, the secondary-side full bridge circuit includes a third switching leg that includes the IGBT 21 and the IGBT 22 connected to each other, and a fourth switching leg that includes the IGBT 23 and the IGBT 24 connected to each other.

Further, a center tap is provided to the primary winding of the transformer 3, and the center tap is connected to a node between the capacitor $15a$ and the capacitor $15c$ and the input/output terminal $1b$.

Further, a node between the IGBT 11 and the IGBT 12 is connected to one end of the primary winding of the transformer 3 via a reactor $16a$. A node between the IGBT 13 and the IGBT 14 is connected to the other end of the primary winding of the transformer 3 via a reactor $16b$. As the reactor $16a$, for example, a coil, the leakage inductance of the primary winding of the transformer 3, or both of the coil and the leakage inductance of the primary winding of the transformer 3 may be used. As the reactor $16b$, for example, a coil, the leakage inductance of the primary winding of the transformer 3, or both of the coil and the leakage inductance of the primary winding of the transformer 3 may be used.

Further, a node between the IGBT 21 and the IGBT 22 is connected to one end of the secondary winding of the transformer 3 via a reactor 26. A node between the IGBT 23 and the IGBT 24 is connected to the other end of the secondary winding of the transformer 3. As the reactor 26, for example, a coil, the leakage inductance of the secondary winding of the transformer 3, or both of the coil and the leakage inductance of the secondary winding of the transformer 3 may be used.

The power conversion device of the present embodiment further includes a controller 4 configured to control switching of each IGBT.

The controller 4 includes a voltage detection unit and detects voltages V11, V12, V1, and V2. The voltage V11 is a voltage between the input/output terminal $1a$ and the input/output terminal $1b$ on the primary side. The voltage V12 is a voltage between the input/output terminal $1b$ and the input/output terminal $1c$ on the primary side. The voltage V1 is a voltage between the input/output terminal $1a$ and the input/output terminal $1c$ on the primary side. The voltage V2 is a voltage between the input/output terminal $2a$ and the input/output terminal $2c$ on the secondary side.

The controller 4 includes a current detection unit and detects currents I11, I12, I1, and I2. The current I11 is a current that flows through a primary-side wire $19a$. The current I12 is a current that flows through a primary-side wire $19c$. The current I1 is a current that flows through a primary-side wire $19b$. The current I2 is a current that flows through a secondary-side wire $29a$.

Figure 2:
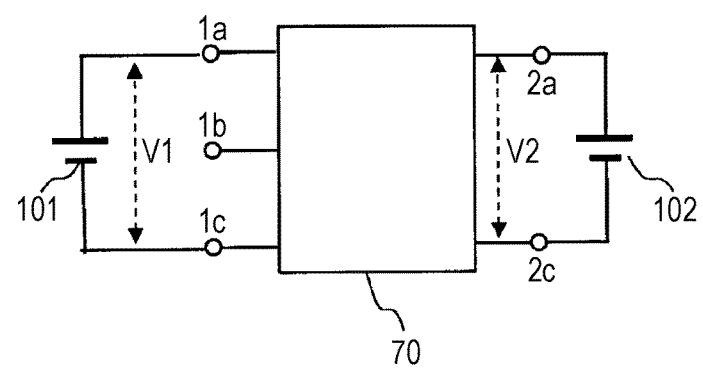
FIG. 2 is a diagram illustrating a connection relationship between the power conversion device and a storage battery according to the first embodiment of the present disclosure.

Further, as illustrated in FIG. 2, a storage battery 101 is connected between the input/output terminal $1a$ and the input/output terminal $1c$ on the primary side, and a storage battery 102 is connected between the input/output terminal $2a$ and the input/output terminal $2b$ on the secondary side.

The power conversion device 70 of the present embodiment (excluding the input/output terminals 1a, 1b, 1c, 2a, and 2c) bidirectionally transmits power between the storage battery 101 and the storage battery 102.

Figure 3A:
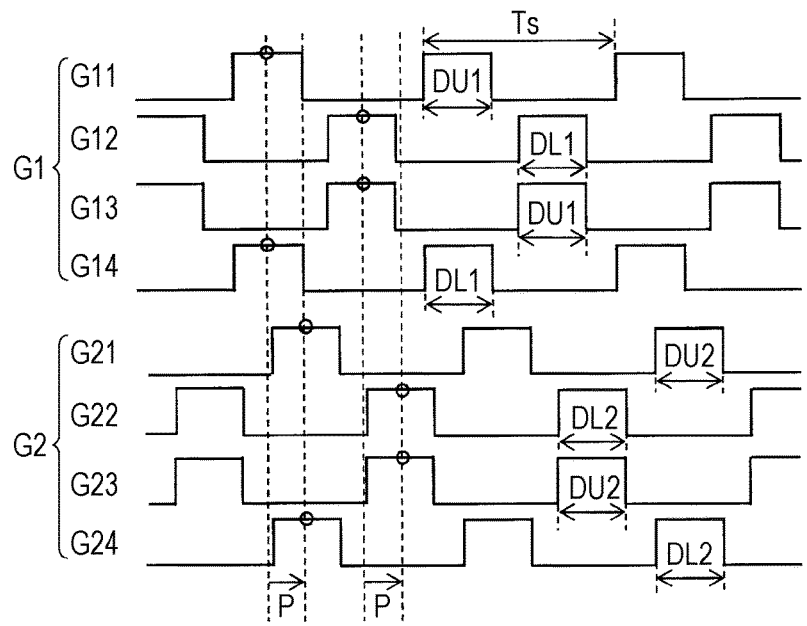
FIG. 3A is a time chart illustrating the waveforms of gate drive signals.

The controller 4 switches the IGBTs with gate drive signals having the same cycle, which are illustrated in FIG. 3A, for example. Here, gate drive signals G11, G12, G13, and G14 are gate drive signals for the respective IGBTs of the primary-side full bridge circuit, that is, the IGBT 11, the IGBT 12, the IGBT 13, and the IGBT 14. Further, gate drive signals G21, G22, G23, and G24 are gate drive signals for the respective IGBTs of the secondary-side full bridge circuit, that is, the IGBT 21, the IGBT 22, the IGBT 23, and the IGBT 24.

In this case, in the primary-side full bridge circuit, the IGBT 11 and the IGBT 12 constituting the first switching leg are switched at prescribed duty ratios DU1/Ts and DL1/Ts and a phase shift of 180°. In a similar manner, the IGBT 13 and the IGBT 14 constituting the second switching leg are switched at the prescribed duty ratios DU1/Ts and DL1/Ts and a phase shift of 180°.

Further, the IGBT 11 and the IGBT 14, which are located at positions on one diagonal in the primary-side full bridge circuit, are switched with the gate drive signals G11 and G14 having the same waveform. The IGBT 12 and the IGBT 13, which are located at positions on the other diagonal in the primary-side full bridge circuit, are switched with the gate drive signals G12 and G13 having the same waveform.

Further, in the secondary-side full bridge circuit, the IGBT 21 and the IGBT 22 constituting the third switching leg are switched at prescribed duty ratios DU2/Ts and DL2/Ts and a phase shift of 180°. In a similar manner, the IGBT 23 and the IGBT 24 constituting the fourth switching leg are switched at the prescribed duty ratios DU2/Ts and DL2/Ts and a phase shift of 180°.

Further, the IGBT 21 and the IGBT 24, which are located at positions on one diagonal in the secondary-side full bridge circuit, are switched with the gate drive signals G21 and G24 having the same waveform. The IGBT 22 and the IGBT 23, which are located at positions on the other diagonal in the secondary-side full bridge circuit, are switched with the gate drive signals G22 and G23 having the same waveform.

Here, the controller 4 controls a retardation P of switching between the first full bridge circuit and the second full bridge circuit so that the storage battery 101 or 102 is charged with a prescribed certain current. The controller 4 may further control the retardation P so that the primary-side voltage V1 and the secondary-side voltage V2 do not deviate from respective prescribed voltage value ranges.

Figure 3B:
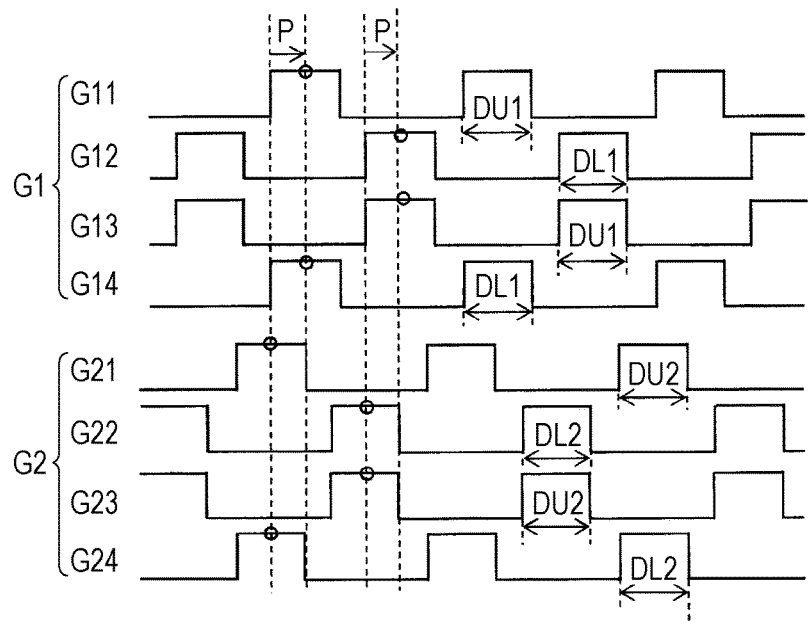
FIG. 3B is a time chart illustrating the waveforms of the gate drive signals.

When power is transmitted from the primary side to the secondary side, as illustrated in FIG. 3A, the switching of the secondary-side full bridge circuit is delayed from the switching of the primary-side full bridge circuit by the retardation P. When power is transmitted from the secondary side to the primary side, on the other hand, as illustrated in FIG. 3B, the switching of the primary-side full bridge circuit is delayed from the switching of the secondary-side full bridge circuit by the retardation P.

Figure 4:
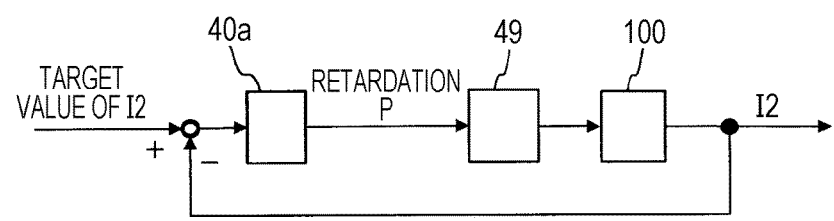
FIG. 4 is a block diagram of current control.

For example, when power is transmitted from the primary side to the secondary side, that is, when the storage battery 101 is discharged to charge the storage battery 102, control may be performed so that the storage battery 102 is charged with a certain current. As illustrated in the block diagram of FIG. 4, which illustrates current control of controlling the current I2, the controller 4 detects the secondary-side current I2, calculates the retardation P by a current controller 40a on the basis of a difference between the current I2 and a target current value, and switches each IGBT of a circuit 100 with a drive signal generated by a gate drive circuit 49. When power is transmitted from the secondary side to the primary side, that is, when the storage battery 102 is discharged to charge the storage battery 101, control may be performed so that the storage battery 101 is charged with a certain current. Specifically, the current I11 or the current I12 may be controlled.

With the power conversion device of the present embodiment, an intermediate voltage having a potential at a neutral conductor for an AC output of a single-phase three-wire system of an AC/DC power conversion circuit can be output from the input/output terminal 1b. Further, with the power conversion device of the present embodiment, bidirectional power conversion can be performed.

Second Embodiment

Figure 5:
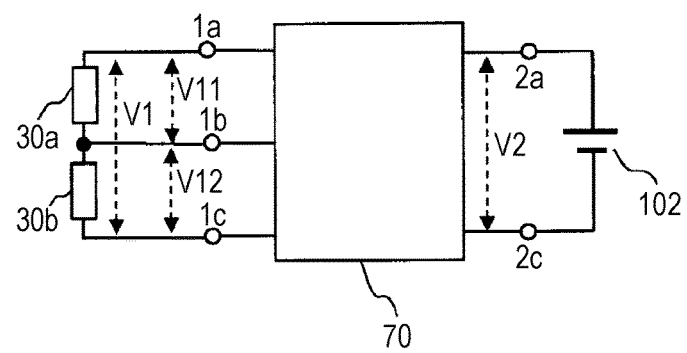
FIG. 5 is a diagram illustrating a connection relationship between a power conversion device and a storage battery according to a second embodiment of the present disclosure.

A power conversion device of the present embodiment has the same configuration as the power conversion device of the first embodiment described above. In the present embodiment, as illustrated in FIG. 5, a DC load 30a is connected between the input/output terminal 1a and the input/output terminal 1b on the primary side, a DC load 30b is connected between the input/output terminal 1b and the input/output terminal 1c on the primary side, and the storage battery 102 is connected between the input/output terminal 2a and the input/output terminal 2b on the secondary side.

Figure 6A:
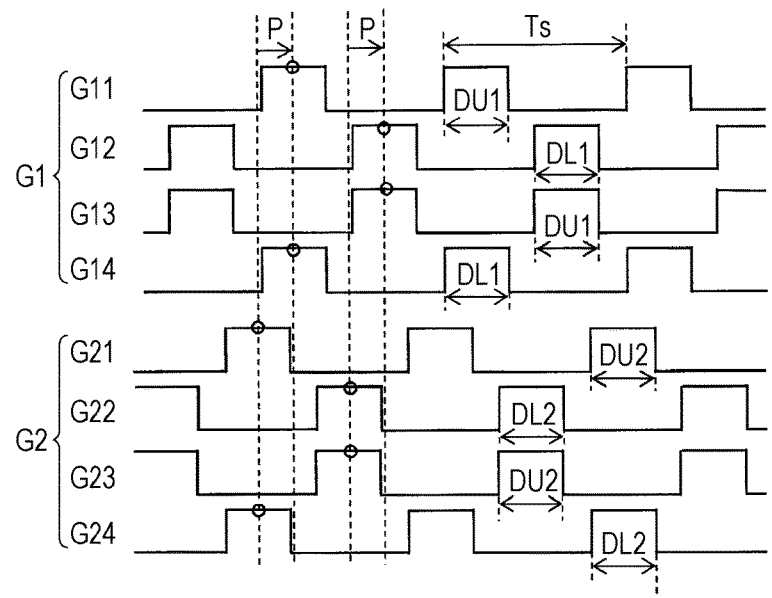
FIG. 6A is a time chart illustrating the waveforms of the gate drive signals.

The controller 4 can switch, as in the first embodiment, the IGBTs with the gate drive signals having the same cycle, which are illustrated in FIG. 6A, to thereby supply power from the storage battery 102 to the DC loads 30a and 30b.

Here, the controller 4 controls the retardation P of switching between the first full bridge circuit and the second full bridge circuit so that the primary-side voltage V1 has a target voltage value. In the present embodiment, power is transmitted from the secondary side, on which the storage battery 102 is connected, to the primary side, on which the DC loads 30a and 30b are connected, and hence the controller 4 delays the switching phase of the primary-side full bridge circuit from that of the secondary-side full bridge circuit.

At this time, when the DC load 30a and the DC load 30b are substantially the same, a balance between the voltage V11 and the voltage V12 is maintained. Further, the controller 4 controls switching of a switching mode so that the voltage V11 and the voltage V12 have a voltage difference of zero.

Figure 6B:
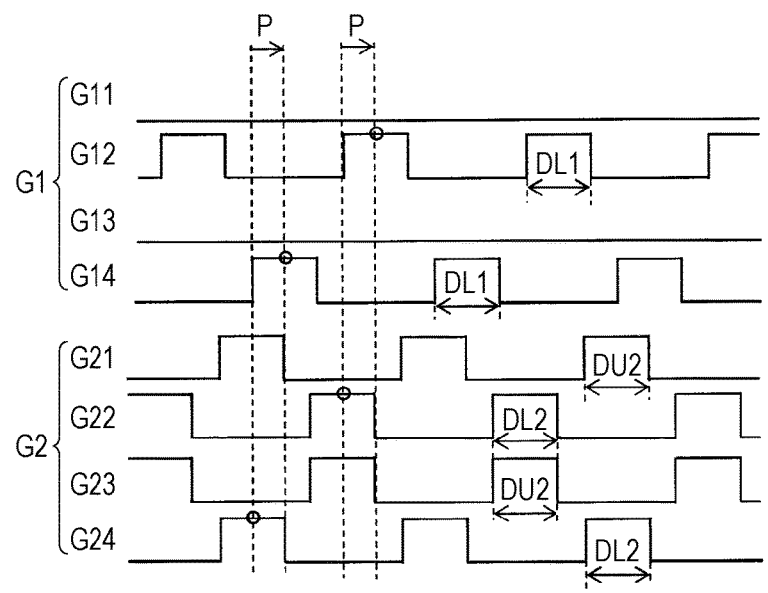
FIG. 6B is a time chart illustrating the waveforms of the gate drive signals.

For example, when the upper-side DC load 30a is large and "voltage V11<voltage V12" is satisfied, the controller 4 switches the switching mode to a second switching mode in which the gate drive signals illustrated in FIG. 6B are output. In the second switching mode, the IGBT 11 and the IGBT 13 are fixed to the OFF state.

Figure 6C:
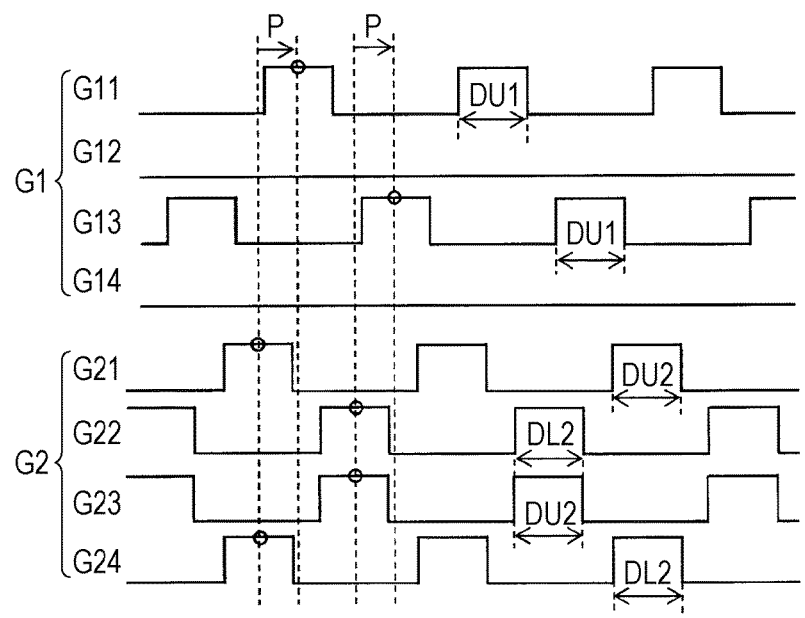
FIG. 6C is a time chart illustrating the waveforms of the gate drive signals.

In a similar manner, when the lower-side DC load 30b is large and "voltage V11>voltage V12" is satisfied, the controller 4 switches the switching mode to a third switching mode in which the gate drive signals illustrated in FIG. 6C are output. In the third switching mode, the IGBT 12 and the IGBT 14 are fixed to the OFF state.

Figure 7A:
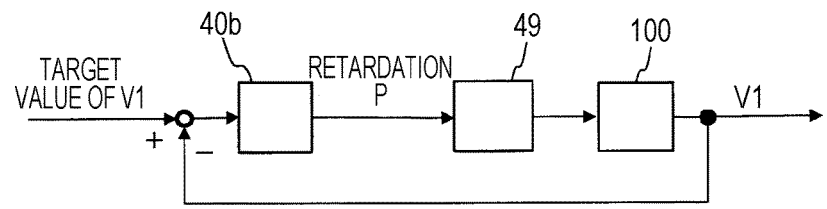
FIG. 7A is a block diagram of voltage control.
Figure 7B:
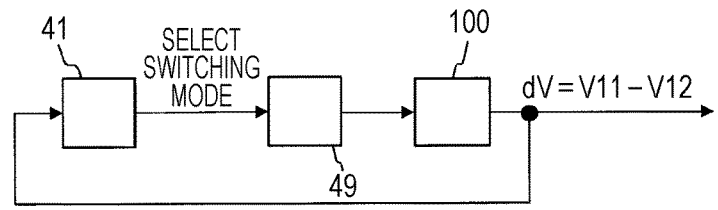
FIG. 7B is a block diagram of voltage balance control.

The above-mentioned control can be achieved by following control blocks illustrated in FIG. 7A and FIG. 7B, for example. FIG. 7A is a block diagram of voltage control for controlling the voltage V1 to be a desired voltage. As illustrated in FIG. 7A, the controller 4 detects the voltage V1, calculates the retardation P by a voltage controller 40b on the basis of a difference between the voltage V1 and a target voltage value, and switches each IGBT of the circuit 100 with a drive signal generated by the gate drive circuit 49.

Further, the switching mode at this time is determined as follows. FIG. 7B is a block diagram of voltage balance control for making the voltage V11 and the voltage V12 have a voltage difference of zero. As illustrated in FIG. 7B, the controller 4 selects the switching mode by a voltage balance controller 41 on the basis of a difference between the voltage V11 and the voltage V12, and switches each IGBT of the circuit 100 with a drive signal generated by the gate drive circuit 49.

Figure 7C:
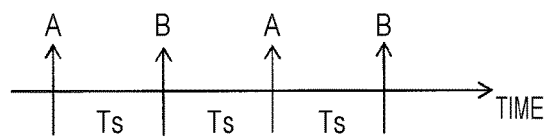
FIG. 7C is a time chart illustrating control timing.

In this case, as illustrated in FIG. 7C, the gate drive signals are updated at a voltage control timing A and a balance control timing B in synchronization with the switching cycle. The gate drive signals may be generated in consideration of both of the result of switching mode selection and the retardation P. Updating the gate drive signals at different timings of the voltage control timing A and the balance control timing B provides an effect that variance of calculation time is achieved while the control is performed at a certain cycle.

Figure 8:
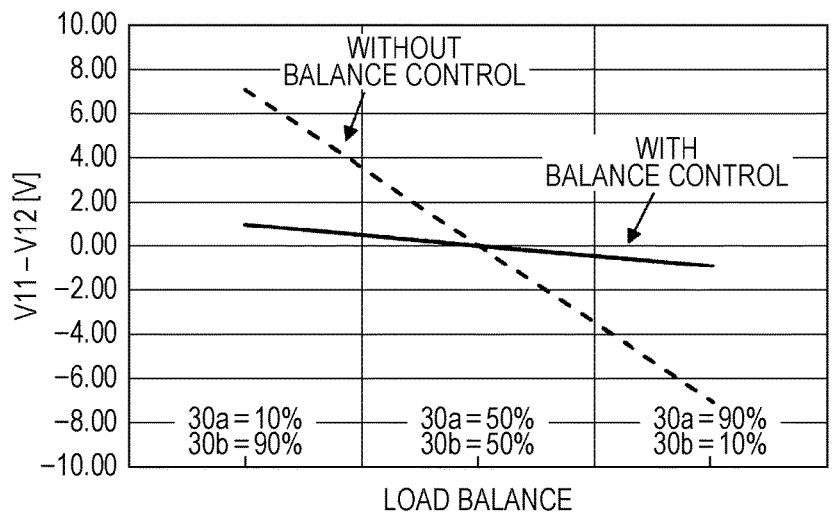
FIG. 8 is a characteristic diagram of an average voltage balance with respect to a load balance.

FIG. 8 is a diagram of a comparison between a case where the voltage balance control is performed and a case where the voltage balance control is not performed in terms of the characteristics of an average voltage balance (voltage V11-voltage V12) with respect to a load balance when transmission power is 5.5 kW, the voltage V1 is 350 V, and the voltage V2 is 350 V, for example. It is found that, when the loads have an unbalance, a difference between the voltage V11 and the voltage V12 is reduced to be improved through the voltage balance control.

Third Embodiment

Figure 9:
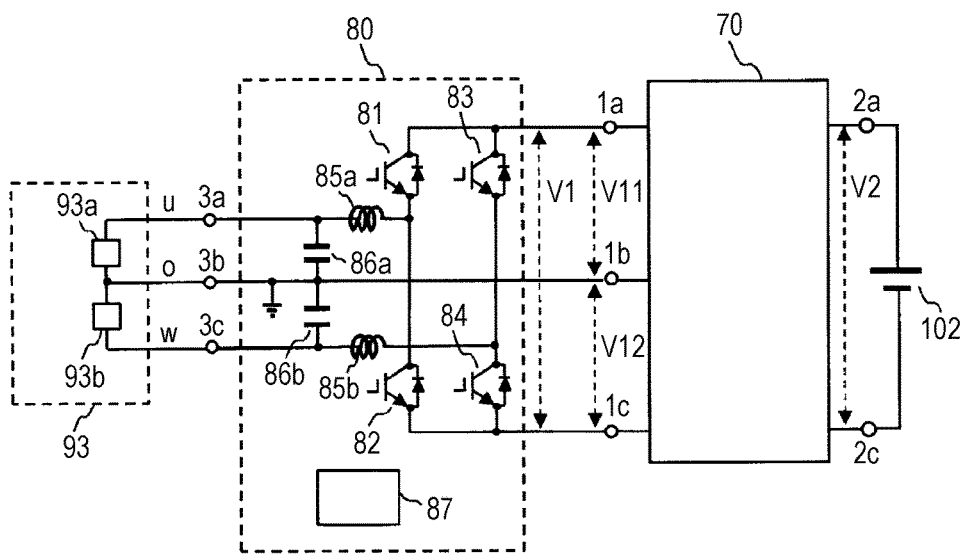
FIG. 9 is a configuration diagram illustrating a power conversion device according to a third embodiment of the present disclosure.

FIG. 9 is a configuration diagram illustrating a power conversion device according to a third embodiment of the present disclosure. The power conversion device of the present embodiment has a configuration obtained by connecting an AC/DC conversion circuit 80 of the single-phase three-wire system on the primary side of the DC/DC power conversion circuit illustrated in FIG. 1. The storage battery 102 is connected on the secondary side, and an AC load 93 is connected to the output of the AC/DC conversion circuit 80.

The power conversion device 70 (excluding the input/output terminals 1a, 1b, 1c, 2a, and 2c) has the same configuration as the power conversion device 70 (excluding the input/output terminals 1a, 1b, 1c, 2a, and 2c) of the first embodiment.

The AC/DC conversion circuit 80 includes a full bridge circuit including a switching leg that includes an IGBT 81 and an IGBT 82 connected to each other, and a switching leg that includes an IGBT 83 and an IGBT 84 connected to each other. Further, the AC/DC conversion circuit 80 includes an AC/DC controller 87 configured to control switching of the IGBTs 81 to 84.

A node between the IGBT 81 and the IGBT 82 is connected to one end of a capacitor 86a via a reactor 85a. In the present embodiment, the one end of the capacitor 86a is a first AC output (u phase). Further, a node between the IGBT 83 and the IGBT 84 is connected to the other end of a capacitor 86b via a reactor 85b. In the present embodiment, the other end of the capacitor 86b is a second AC output (w phase). Further, in the present embodiment, a node between the capacitor 86a and the capacitor 86b is a third AC output (o phase).

Here, the node between the capacitor 86a and the capacitor 86b is connected to the input/output terminal 1b.

Further, the AC load 93 includes a u-phase AC load 93a and a w-phase AC load 93b. Here, when the AC load 93 is connected in an unbalanced manner, the voltage balance between the voltage V11 and the voltage V12 is lost, leading to a fluctuation depending on an AC frequency. Specifically, at a timing when larger one of the u-phase AC load 93a and the w-phase AC load 93b is driven, a voltage between corresponding terminals may drop, with the result that a sufficient AC voltage output may not be obtained.

In the present embodiment, the controller 4 of the power conversion device 70 performs control to set the voltage V1 to a prescribed value and maintain the voltage balance between the voltage V11 and the voltage V12.

Figure 10A:
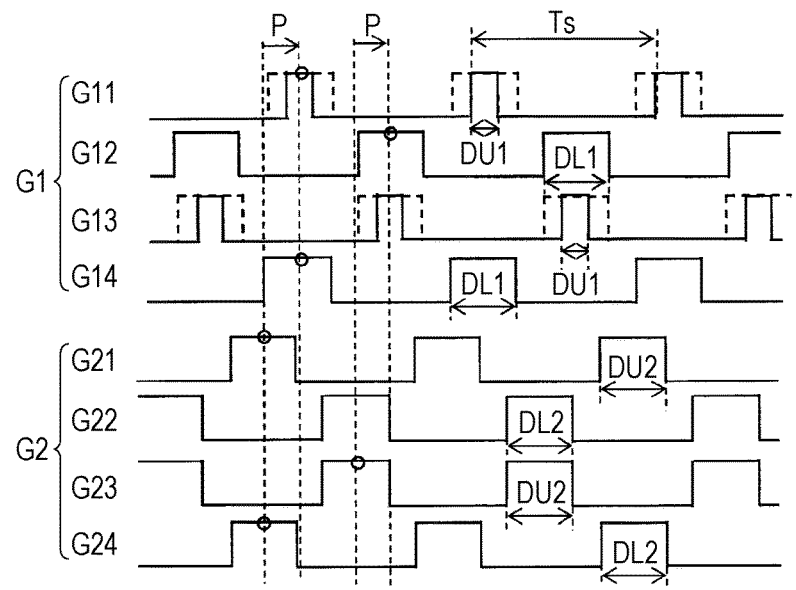
FIG. 10A is a time chart illustrating the waveforms of the gate drive signals.
Figure 10B:
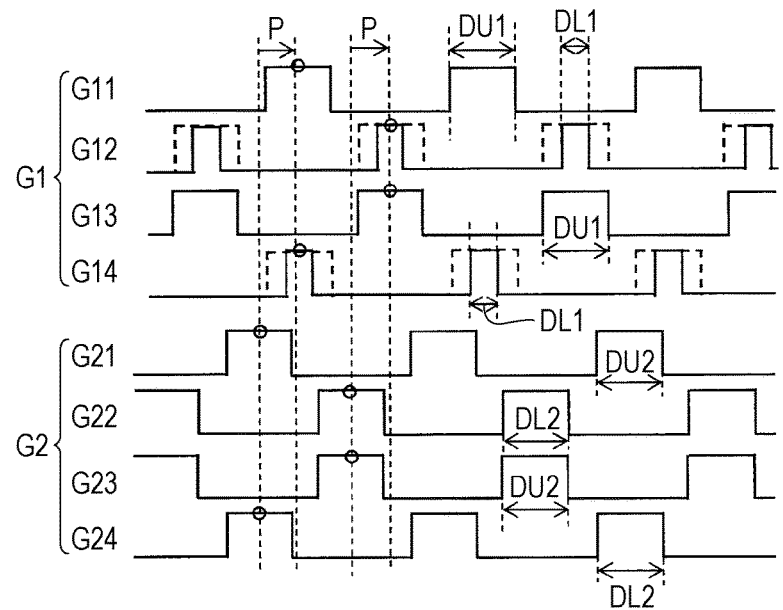
FIG. 10B is a time chart illustrating the waveforms of the gate drive signals.

Here, the controller 4 controls, as illustrated in FIG. 10A and FIG. 10B, the voltage V11 and the voltage V12 to take close values by controlling the duty ratio DU1/Ts of the IGBT 11 and the IGBT 13 and the duty ratio DL1/Ts of the IGBT 12 and the IGBT 14 of the primary-side full bridge circuit.

Figure 11A:
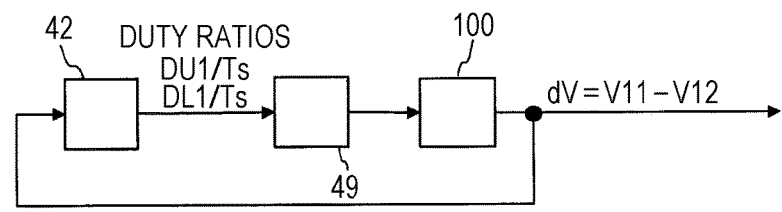
FIG. 11A is a block diagram of the voltage balance control.

The above-mentioned control can be achieved by following voltage balance control blocks illustrated in FIG. 11A, for example. As illustrated in FIG. 11A, the controller 4 detects the voltage V11 and the voltage V12, calculates, by a voltage balance controller 42, the duty ratios DU1/Ts and DL1/Ts on the basis of a voltage difference dV between the voltage V11 and the voltage V12, and switches each IGBT of the circuit 100 with a drive signal generated by the gate drive circuit 49.

Figure 12:
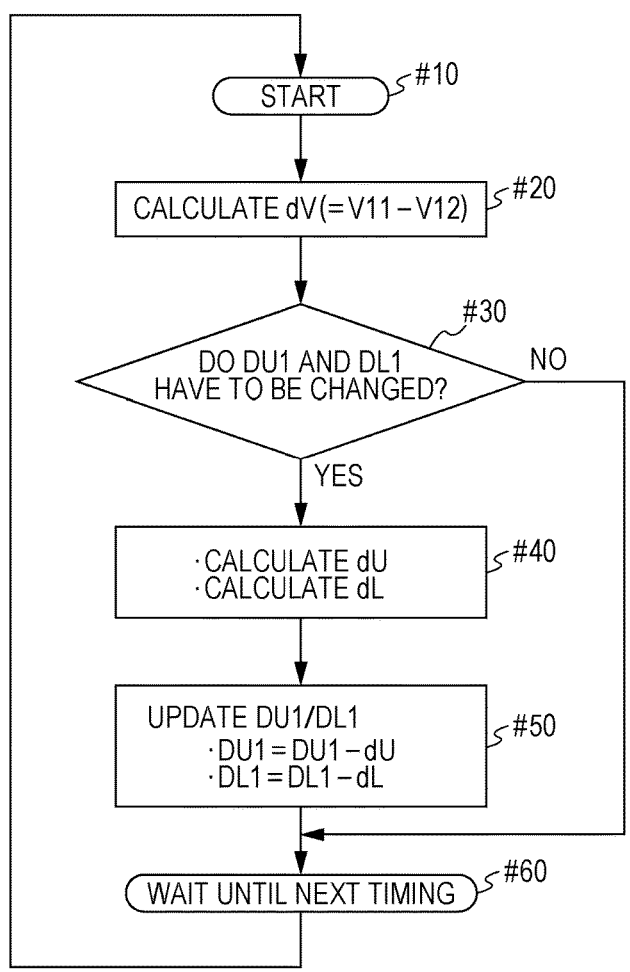
FIG. 12 is a flowchart of the voltage balance control.

As illustrated in the flowchart of FIG. 12, when starting the control operation in Step #10, the controller 4 detects the voltage V11 and the voltage V12, and calculates the voltage difference dV therebetween (Step #20).

Figure 11B:
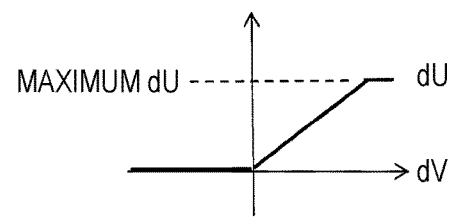
FIG. 11B is a chart illustrating the change amount of an ON time DU1.
Figure 11C:
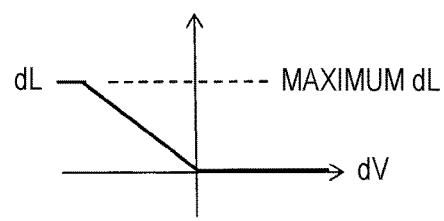
FIG. 11C is a chart illustrating the change amount of an ON time DL1.

Next, the controller 4 determines whether DU1 and DL1 have to be changed or not (Step #30). For example, when the voltage difference dV is smaller than a prescribed allowable value, the controller 4 determines that DU1 and DL1 do not have to be changed. When DU1 and DL1 do not have to be changed, the controller 4 proceeds to Step #60 described later. When DU1 and DL1 have to be changed, on the other hand, the controller 4 respectively obtains, as illustrated in FIG. 11B and FIG. 11C, the change amounts of DU1 and DL1 as dU and dL on the basis of the voltage difference dV (Step #40). The maximum values of the change amounts dU and dL may be defined so that the duty ratios (ON duties) do not fall below 0.

In Step #50 subsequent to Step #40, the controller 4 updates DU1 and DL1, that is, the controller 4 obtains, as new DU1, a value by subtracting the change amount dU from DU1, and obtains, as new DL1, a value by subtracting the change amount dL from DL1. In Step #60 subsequent to Step #50, the controller 4 waits until the start of next control. Here, a case where the voltage difference dV is positive (voltage V11>voltage V12) corresponds to a case where the AC load 93b is large. The voltage balance is improved in this case by reducing the duty ratio (ON duty) of the IGBT 12 and the IGBT 14. The duty ratio (ON duty) is gradually changed and hence switching is not suddenly performed, which means that smooth control can be performed.

Figure 13A:
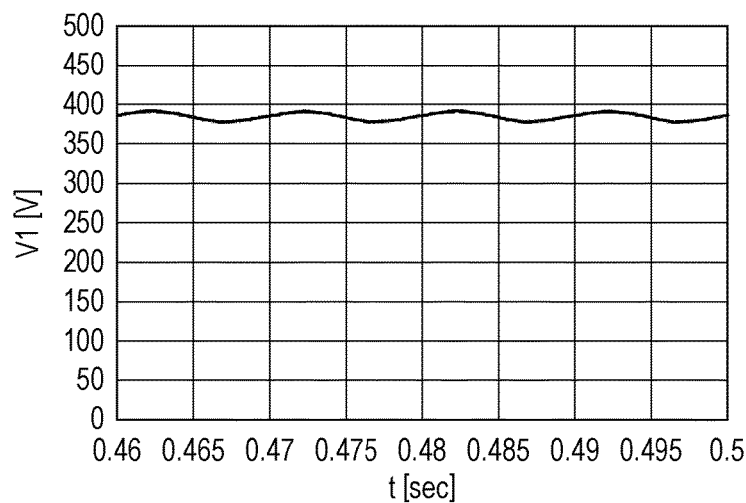
FIG. 13A is a time chart of a voltage V1.
Figure 13B:
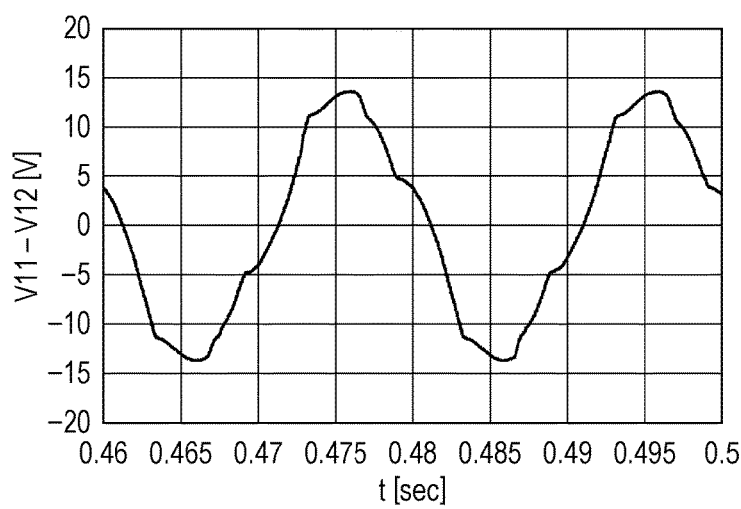
FIG. 13B is a time chart of a difference between a voltage V11 and a voltage V12.

For example, in a case where the AC load 93 has an unbalance and only a load of 2.75 kW is connected as the AC load 93a, when only the voltage control (the control of the voltage V1) is performed, the difference between the voltage V11 and the voltage V12 fluctuates depending on an AC frequency as illustrated in FIG. 13B although the voltage V1 is maintained at the prescribed value as illustrated in FIG.

Figure 13C:
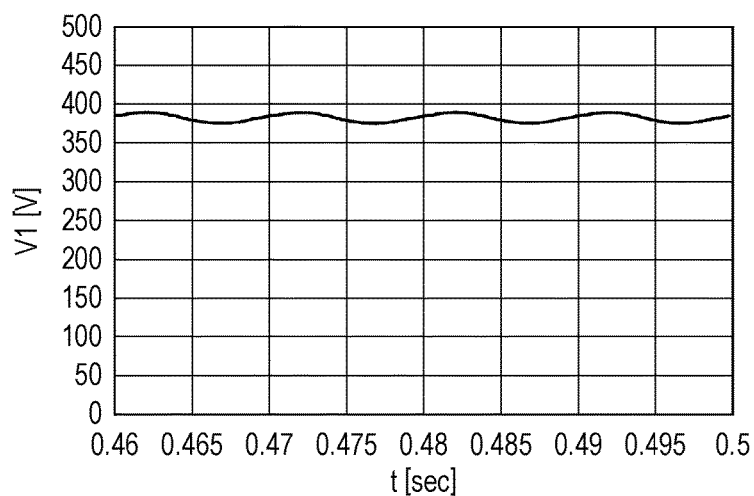
FIG. 13C is a time chart of the voltage V1.
Figure 13D:
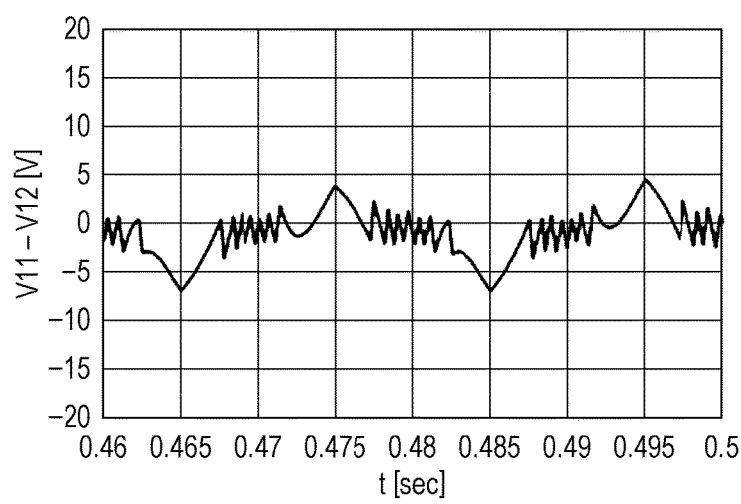
FIG. 13D is a time chart of a difference between the voltage V11 and the voltage V12.
Figure 13E:
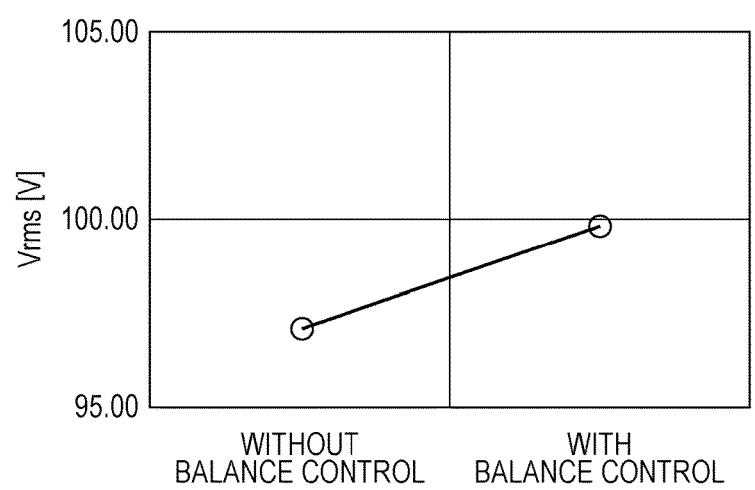
FIG. 13E is a chart illustrating the voltage level of an AC load.

13A. Here, it is found that the difference between the voltage V11 and the voltage V12 can be reduced while the voltage V1 is maintained at the prescribed value by performing the voltage control (the control of the voltage V1) and the voltage balance control as illustrated in FIG. 13C and FIG. 13D. As a result, there is provided an effect that the voltage level of the AC load 93a is raised to be improved as illustrated in FIG. 13E.

Fourth Embodiment

Figure 14:
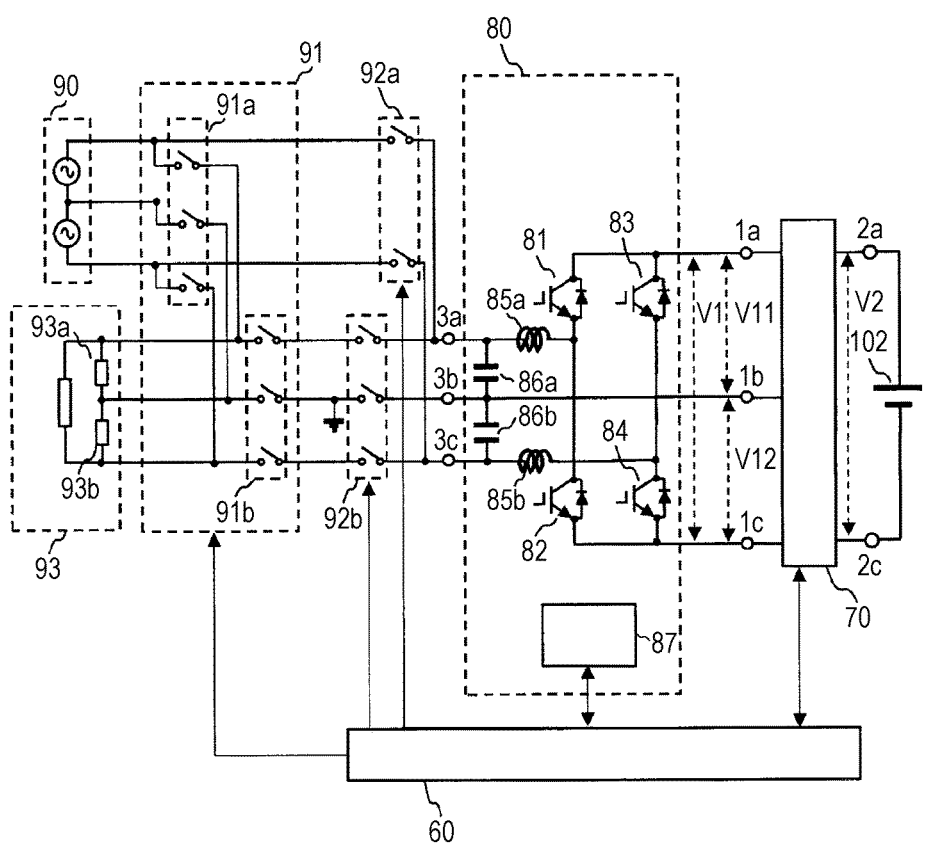
FIG. 14 is a configuration diagram illustrating a power conversion system according to a fourth embodiment of the present disclosure.

FIG. 14 is a configuration diagram illustrating a power conversion system according to a fourth embodiment of the present disclosure. In the present embodiment, as in the third embodiment, the AC/DC conversion circuit 80 of the single-phase three-wire system is connected on the primary side of the DC/DC power conversion circuit illustrated in FIG. 1. On the secondary side, the storage battery 102 is connected.

Further, AC input/output terminals 3a to 3c of the AC/DC conversion circuit 80 are connected to a switch portion 91 via relays 92a and 92b. Here, the relay 92a establishes or cuts connection between the AC input/output terminals 3a and 3c of the AC/DC conversion circuit 80 and a power grid 90. Further, the relay 92b establishes or cuts connection between the AC input/output terminals 3a, 3b, and 3c of the AC/DC conversion circuit 80 and a relay 91b. Further, the switch portion 91 includes a relay 91a and the relay 91b. The relay 91a establishes or cuts connection between the power grid 90 and the AC load 93. Further, the relay 91b establishes or cuts connection between the relay 92b and the AC load 93.

Further, the power conversion system of the present embodiment includes a system controller 60. The system controller 60 controls the power conversion device 70, the AC/DC conversion circuit 80, and the relays 91a, 91b, 92a, and 92b.

In a normal state, the system controller 60 closes the relay 91a to supply power to the AC load 93. At this time, the system controller 60 can close the relay 92a, thereby charging the storage battery 102 with power of the power grid 90 or discharging power of the storage battery 102 to the AC load 93 or the power grid 90. Here, the AC/DC conversion circuit 80 is connected to the power grid 90 in a single phase and thus does not have an unbalance. This means that the power conversion device 70 can charge/discharge the storage battery 102 with a certain current by the control method described in the first embodiment, for example.

Further, in the event of a power failure, the system controller 60 opens the relay 91a to cut the connection between the AC load 93 and the power grid 90, and closes the relay 91b to establish the connection between the AC load 93 and the relay 92b. At this time, the system controller 60 can close the relay 92b, thereby supplying power of the storage battery 102 to the AC load 93. Here, even when the AC load is connected in an unbalanced manner as described in the third embodiment, the AC/DC conversion circuit 80 can obtain stable output by operating as the single-phase three-wire system.

CONCLUSION

The embodiments of the present disclosure are described so far. The scope of the present disclosure is, however, not limited to the embodiments, and various modifications can be made thereto without departing from the gist of the present disclosure.

The power conversion device described above has a configuration (first configuration) including: a first capacitor circuit that includes a first capacitor (15a) and a second capacitor (15c) connected in series; a first full bridge circuit and a second full bridge circuit; a transformer (3); a first reactor (16a) connected between the first full bridge circuit and the transformer; a second reactor (16b) connected between the first full bridge circuit and the transformer; a third reactor (26) connected between the second full bridge circuit and the transformer; and a controller (4), in which the first full bridge circuit includes a first switching leg that includes a first switching element (11) and a second switching element (12) connected to each other, and a second switching leg that includes a third switching element (13) and a fourth switching element (14) connected to each other, the first full bridge circuit is connected in parallel to the first capacitor circuit, the transformer includes a center tap at primary winding, the center tap is connected to a node between the first capacitor and the second capacitor, one end of the first reactor is connected to a node between the first switching element and the second switching element, one end of the second reactor is connected to a node between the third switching element and the fourth switching element, the second full bridge circuit includes a third switching leg that includes a fifth switching element (21) and a sixth switching element (22) connected to each other, and a fourth switching leg that includes a seventh switching element (23) and an eighth switching element (24) connected to each other, one end of the third reactor is connected to a node between the fifth switching element and the sixth switching element, the first switching element to the eighth switching element are connected in parallel to respective capacitors (11a to 14a and 21a to 24a), and the controller controls switching of the first switching element to the eighth switching element to adjust a retardation of switching between the first full bridge circuit and the second full bridge circuit, to thereby control transmission power.

With this configuration, a voltage at the input/output terminal of the primary-side circuit is divided by the first capacitor and the second capacitor, and the center tap provided to the primary winding of the transformer is connected to the node between the first capacitor and the second capacitor, with the result that an intermediate voltage can be output.

Here, when the first capacitor and the second capacitor have substantially the same capacitance value, and the first reactor and the second reactor have substantially the same reactance value, the primary-side circuit can have a symmetrical configuration. In addition, when the impedance value of a load that is connected to both the ends of the first capacitor and the impedance value of a load that is connected to both the ends of the second capacitor are substantially the same, or when a load is connected to both the ends of the first capacitor circuit, the configuration including the loads is symmetrical. Thus, transmission power can be controlled under a state where a voltage at the first capacitor and a voltage at the second capacitor are balanced, through adjustment of the switching phases of the first full bridge circuit and the second full bridge circuit.

Further, each end of the first capacitor circuit is the primary-side input/output terminal, and hence a DC/DC power conversion device configured to bidirectionally convert power can be achieved.

The power conversion device having the above-mentioned first configuration may have a configuration (second configuration) in which the first reactor is connected to one end of the primary winding and/or is a leakage inductance of the primary winding, the second reactor is connected to another end of the primary winding and/or is the leakage inductance of the primary winding, and the third reactor is connected to a secondary winding of the transformer and/or is a leakage inductance of the secondary winding.

The power conversion device having the above-mentioned first or second configuration may have a configuration (third configuration) in which the first switching element to the eighth switching element are connected in parallel to respective diodes.

With this configuration, even when an IGBT including no diode is used as the switching element, for example, a desired operation can be achieved by connecting a diode in inverse parallel to the switching element.

The power conversion device having any one of the above-mentioned first to third configurations may have a configuration (fourth configuration) in which the controller has at least a first switching mode in which the first switching element to the eighth switching element are all switched, a second switching mode in which the first switching element and the third switching element are fixed to an OFF state, and a third switching mode in which the second switching element and the fourth switching element are fixed to the OFF state, and the controller selectively switches between a plurality of switching modes that include the first switching mode to the third switching mode based on a difference between a voltage at the first capacitor and a voltage at the second capacitor, to thereby control the voltage at the first capacitor and the voltage at the second capacitor to approach an identical value.

When the impedance value of a load that is connected to both the ends of the first capacitor and the impedance value of a load that is connected to both the ends of the second capacitor are different from each other, the balance of voltage sharing between the first capacitor and the second capacitor deteriorates. In such a case, it is not possible to expect that the control for controlling a voltage across the ends of the first capacitor circuit provides an effect of improving the balance.

With the above-mentioned fourth configuration, however, the switching operation is performed in an asymmetric manner, and hence the voltage balance can be controlled. For example, when a period in which a switching element provided on a conductive path being in parallel to the first capacitor or the second capacitor is turned off is lengthened, the discharge paths of these capacitors are restricted, which provides an effect of maintaining the voltage.

The power conversion device having any one of the above-mentioned first to third configurations may have a configuration (fifth configuration) in which the controller performs adjustment, based on a difference between a voltage at the first capacitor and a voltage at the second capacitor, such that an ON time of the first switching element and the third switching element or an ON time of the second switching element and the fourth switching element is smaller than ON times of other switching elements of the first switching element to the eighth switching element, to thereby control the voltage at the first capacitor and the voltage at the second capacitor to approach an identical value.

With this configuration, for example, the ON time of the first switching element and the third switching element or the ON time of the second switching element and the fourth switching element is adjusted on the basis of the difference between the voltage at the first capacitor and the voltage at the second capacitor, and the ON times of the other switching elements of the first to eighth switching elements are fixed so that the ON time of the first switching element and the third switching element or the ON time of the second switching element and the fourth switching element is gradually changed. In this way, smooth control with a small fluctuation of the voltage balance can be performed.

The power conversion device having any one of the above-mentioned first to fifth configurations may have a configuration (sixth configuration) in which the power conversion device further includes an AC/DC conversion circuit, the AC/DC conversion circuit includes a fifth switching leg that includes a ninth switching element and a tenth switching element connected to each other, a sixth switching leg that includes an eleventh switching element and a twelfth switching element connected to each other, a second capacitor circuit that includes a third capacitor and a fourth capacitor connected in series, a fourth reactor connected between a node between the ninth switching element and the tenth switching element, and one end of the second capacitor circuit, and a fifth reactor connected between a node between the eleventh switching element and the twelfth switching element, and another end of the second capacitor circuit, the one end of the second capacitor circuit is a first AC input/output terminal, the another end of the second capacitor circuit is a second AC input/output terminal, and a node between the third capacitor and the fourth capacitor is a third AC input/output terminal, and the node between the third capacitor and the fourth capacitor is connected to the node between the first capacitor and the second capacitor.

With this configuration, a potential at the node between the first capacitor and the second capacitor is controlled, and hence a switching circuit for generating and controlling a potential at a neutral conductor of an AC/DC power conversion device of the single-phase three-wire system is unnecessary. Consequently, improvement of efficiency, a reduction in size of the circuit, and a cost reduction can be achieved.

In an inverter of the single-phase three-wire system, when an AC load is connected in an unbalanced manner, a DC bus voltage drops depending on an AC frequency and a ripple is generated in the DC bus voltage. When the DC bus voltage drops, an AC voltage level on a side with a large load drops, leading to a deterioration of distortion characteristics. In the power conversion device having the above-mentioned sixth configuration, the voltage balance and the voltage are simultaneously controlled to be stabilized, and hence such a deterioration can be reduced.

The power conversion system described above has a configuration (seventh configuration) including the power conversion device having the above-mentioned sixth configuration, in which in a normal state, a power grid, and the first AC input/output terminal and the second AC input/output terminal are connected to each other, and in an event of a power failure, an AC load, and the first AC input/output terminal, the second AC input/output terminal, and the third AC input/output terminal are connected to each other.

With this configuration, in the event of a power failure, the AC/DC conversion circuit is connected to the AC load to operate as the single-phase three-wire system. Even when the AC load is connected to the AC/DC conversion circuit in an unbalanced manner, the potential at the neutral conductor can be maintained and stable output can thus be obtained.

The present disclosure contains subject matter related to that disclosed in Japanese Priority Patent Application JP 2017-234372 filed in the Japan Patent Office on Dec. 6, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A power conversion device comprising:
a first capacitor circuit that includes a first capacitor and a second capacitor connected in series;
a first full bridge circuit and a second full bridge circuit;
a transformer;
a first reactor connected between the first full bridge circuit and the transformer;
a second reactor connected between the first full bridge circuit and the transformer;
a third reactor connected between the second full bridge circuit and the transformer; and
a controller, wherein
the first full bridge circuit includes
    a first switching leg that includes a first switching element and a second switching element connected to each other, and
    a second switching leg that includes a third switching element and a fourth switching element connected to each other,
the first full bridge circuit is connected in parallel to the first capacitor circuit,
the transformer includes a center tap at a primary winding and the center tap is connected to a node between the first capacitor and the second capacitor,
one end of the first reactor is connected to a node between the first switching element and the second switching element,
one end of the second reactor is connected to a node between the third switching element and the fourth switching element,
the second full bridge circuit includes
    a third switching leg that includes a fifth switching element and a sixth switching element connected to each other, and
    a fourth switching leg that includes a seventh switching element and an eighth switching element connected to each other,
one end of the third reactor is connected to a node between the fifth switching element and the sixth switching element,
the first switching element to the eighth switching element are connected in parallel to respective capacitors, and
the controller controls switching of the first switching element to the eighth switching element to adjust a retardation of switching between the first full bridge circuit and the second full bridge circuit and controls transmission power.

2. The power conversion device according to claim 1, wherein
the first reactor is connected to one end of the primary winding and/or is a leakage inductance of the primary winding,
the second reactor is connected to another end of the primary winding and/or is the leakage inductance of the primary winding, and
the third reactor is connected to a secondary winding of the transformer and/or is a leakage inductance of the secondary winding.

3. The power conversion device according to claim 1, wherein the first switching element to the eighth switching element are connected in parallel to respective diodes.

4. The power conversion device according to claim 1, wherein
the controller has at least
    a first switching mode in which the first switching element to the eighth switching element are all switched,
    a second switching mode in which the first switching element and the third switching element are fixed to an OFF state, and
    a third switching mode in which the second switching element and the fourth switching element are fixed to the OFF state, and
the controller selectively switches between a plurality of switching modes that include the first switching mode to the third switching mode, based on a difference between a voltage at the first capacitor and a voltage at the second capacitor, and controls the voltage at the first capacitor and the voltage at the second capacitor to approach an identical value.

5. The power conversion device according to claim 1, wherein
the controller performs adjustment, based on a difference between a voltage at the first capacitor and a voltage at the second capacitor, such that an ON time of the first switching element and the third switching element or an ON time of the second switching element and the fourth switching element is smaller than ON times of other switching elements of the first switching element to the eighth switching element, and controls the voltage at the first capacitor and the voltage at the second capacitor to approach an identical value.

6. The power conversion device according to claim 1, further comprising:
an AC/DC conversion circuit, wherein
the AC/DC conversion circuit includes
    a fifth switching leg that includes a ninth switching element and a tenth switching element connected to each other,
    a sixth switching leg that includes an eleventh switching element and a twelfth switching element connected to each other,
    a second capacitor circuit that includes a third capacitor and a fourth capacitor connected in series,
    a fourth reactor connected between a node between the ninth switching element and the tenth switching element, and one end of the second capacitor circuit, and
    a fifth reactor connected between a node between the eleventh switching element and the twelfth switching element, and another end of the second capacitor circuit,
the one end of the second capacitor circuit is a first AC input/output terminal, the another end of the second capacitor circuit is a second AC input/output terminal, and a node between the third capacitor and the fourth capacitor is a third AC input/output terminal, and
the node between the third capacitor and the fourth capacitor is connected to the node between the first capacitor and the second capacitor.

7. A power conversion system comprising:
the power conversion device according to claim 6, wherein
in a normal state, a power grid, and the first AC input/output terminal and the second AC input/output terminal are connected to each other, and in an event of a power failure, an AC load, and the first AC input/output terminal, the second AC input/output terminal, and the third AC input/output terminal are connected to each other.

* * * * *